US011265381B2

(12) United States Patent
Chandra et al.

(10) Patent No.: US 11,265,381 B2
(45) Date of Patent: Mar. 1, 2022

(54) SYSTEM AND METHOD FOR NEAR FIELD COMMUNICATION COUPLING IN A VEHICLE

(71) Applicant: Joyson Safety Systems Acquisition LLC, Auburn Hills, MI (US)

(72) Inventors: Prathap Chandra, Auburn Hills, MI (US); Leonard Cech, Auburn Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 16/368,119

(22) Filed: Mar. 28, 2019

(65) Prior Publication Data
US 2019/0306245 A1 Oct. 3, 2019

Related U.S. Application Data

(60) Provisional application No. 62/649,566, filed on Mar. 28, 2018.

(51) Int. Cl.
*H04L 29/08* (2006.01)
*H04W 4/02* (2018.01)
(Continued)

(52) U.S. Cl.
CPC ............ *H04L 67/125* (2013.01); *H04L 67/18* (2013.01); *H04W 4/023* (2013.01); *B60N 2/002* (2013.01); *H04M 2250/02* (2013.01)

(58) Field of Classification Search
CPC ........ H04L 67/18; H04L 67/125; H04W 4/48; H04W 4/80; H04W 4/023; H04M 2250/02; B60N 2/002
See application file for complete search history.

(56) References Cited

U.S. PATENT DOCUMENTS 6,348,862 B1 2/2002 McDonnell et al.
6,392,542 B1 5/2002 Stanley
(Continued)

FOREIGN PATENT DOCUMENTS

CA 2751797 A1 * 4/2012 ........ H04M 1/72463
CN 106547269 A 3/2017
(Continued)

OTHER PUBLICATIONS https://www.cse.wustl.edu/~jain/cse574-08/ftp/ban/index.html#:~:text=Body%20Area%20Networks%20represent%20the,the%20benefit%20of%20the%20user. (Year: 2008).*
(Continued)

*Primary Examiner* — Kostas J Katsikis
(74) *Attorney, Agent, or Firm* — Meunier Carlin & Curfman LLC (57) ABSTRACT

An electric field personal seat communication protocol within an inductive charging supporting near field communication (NFC) chipset is positioned in respective portions of a vehicle and a personal communications device. Such a chipset can then be utilized to support safety and security applications including the reduction of driver distraction due to cellular phone use at inappropriate times, improved security of vehicle based wireless network based on occupancy detection (E-field sensor 20) and secondary BAN between the seat sensor and NFC enabled devices held/possessed by the occupant. Alternatively, the E-field sensor function could be integrated directly into an NFC chipset that supports the PSC E-field communication protocol.

19 Claims, 6 Drawing Sheets

(51) Int. Cl.
*H04L 67/125* (2022.01)
*H04L 67/52* (2022.01)
*B60N 2/00* (2006.01)

(56) References Cited

U.S. PATENT DOCUMENTS

| | | | |
|---|---|---|---|
| 6,445,294 | B1 | 9/2002 | McDonnell et al. |
| 8,479,864 | B2 | 7/2013 | White et al. |
| 9,919,648 | B1 | 3/2018 | Pederson |
| 10,210,409 | B1* | 2/2019 | Migneco ............ G06K 9/00845 |
| 10,293,788 | B2* | 5/2019 | Okada .................... G01S 11/14 |
| 10,379,535 | B2* | 8/2019 | Migneco ............ A61B 5/0077 |
| 10,384,641 | B2* | 8/2019 | McNabb ............... B60R 25/245 |
| 10,507,774 | B2* | 12/2019 | Liongosari ......... G05B 19/0426 |
| 10,507,775 | B2* | 12/2019 | Liongosari ........ B60R 21/01552 |
| 10,562,497 | B2* | 2/2020 | Okada .................... G01S 11/14 |
| 10,569,727 | B2* | 2/2020 | Shintani .............. G06K 9/00302 |
| 10,618,522 | B2* | 4/2020 | Liu ........................ B60W 50/14 |
| 10,665,140 | B1* | 5/2020 | Ahn ........................ G09F 21/04 |
| 2006/0290516 | A1* | 12/2006 | Muehlsteff .............. B60Q 1/52 340/573.1 |
| 2007/0200721 | A1 | 8/2007 | Stanley et al. |
| 2009/0309751 | A1 | 12/2009 | Kano et al. |
| 2011/0117863 | A1 | 5/2011 | Camp et al. |
| 2011/0221459 | A1* | 9/2011 | Uno .................. B60R 21/01532 324/713 |
| 2011/0260469 | A1* | 10/2011 | Baarman .............. A47C 15/004 290/1 C |
| 2013/0285603 | A1 | 10/2013 | Zeinstra et al. |
| 2014/0162586 | A1 | 6/2014 | Cech |
| 2015/0093988 | A1 | 4/2015 | Konanur et al. |
| 2015/0253753 | A1 | 9/2015 | Bennett et al. |
| 2016/0087485 | A1* | 3/2016 | Maeda .................... H02J 7/025 455/573 |
| 2017/0057542 | A1 | 3/2017 | Kim et al. |
| 2017/0238174 | A1 | 8/2017 | Cech et al. |
| 2017/0291544 | A1* | 10/2017 | Ishihara ................ B60K 37/06 |
| 2018/0034912 | A1 | 2/2018 | Binder et al. |
| 2018/0229674 | A1* | 8/2018 | Heinrich .................. A61B 5/12 |
| 2018/0290627 | A1* | 10/2018 | Hariri ................... B60R 25/245 |
| 2019/0191206 | A1* | 6/2019 | Stachewicz ........ G01C 21/3484 |
| 2019/0306245 | A1* | 10/2019 | Chandra ............... H04W 4/023 |

FOREIGN PATENT DOCUMENTS

| | | |
|---|---|---|
| EP | 2442538 | 4/2012 |
| WO | 2015200224 A2 | 12/2015 |

OTHER PUBLICATIONS https://en.wikipedia.org/wiki/Body_area_network (Year: 2021).*
International Search Report and The Written Opinion issued for Application No. PCT/US2019/024595, dated Jul. 11, 2019, 13 pages.
Office Action issued in CN Application No. 201980035280.0; dated Mar. 19, 2021; 11 pages.

* cited by examiner

FIG. 1

PRIOR ART

Top view

FIG. 6A

Side view

Seat Occupancy Sensor (with NFC function) integrated into vehicle seat (electrodes integrated into seat bottom surface and/or seat back surfaces.

Seat sensor detects occupant, transmits PSC signal through NFC chipset; cellphone detects/uses PSC signal

Seat sensor detects/charges cellphone on vehicle seat

SYSTEM AND METHOD FOR NEAR FIELD COMMUNICATION COUPLING IN A VEHICLE

CROSS REFERENCE TO RELATED APPLICATIONS

This application claims priority to and incorporates entirely by reference U.S. Provisional Patent Application Ser. No. 62/649,566 filed on Mar. 28, 2018, entitled System and Method for Near Field Communication Coupling in a Vehicle.

BACKGROUND

The present application relates generally to the field of wireless communication systems between a personal communications device and circuitry positioned with various components of a vehicle, particularly within the vehicle interior. A personal communications device may include, for example, a cell phone, smart phone, personal digital assistant, tablet computer, laptop computer, e-reader, handheld video games, a global positioning system and the like.

The increased use of electronic devices, particularly mobile personal communications devices, currently allows for continuous communication, entertainment, and the transfer of information from nearly any location. As a result, many individuals carry such electronic devices in direct physical proximity to their bodies throughout the day.

Various systems and methods to electromagnetically couple or "pair" a handheld electronic device with a fixed communication network (e.g., a vehicle communication bus) are known in the art. Further, some systems may automatically detect an electronic device, and enable its "hands-free" application use. Such systems may require a user to perform an initial setup process between the fixed communication network and the electronic device (e.g., a setup process may identify a particular electronic device by using a serial code, mobile equipment identifier (MEID), or similar identifier). Further, each new user, and each additional device may be required to undergo an initial setup process.

Such systems that automatically and electromagnetically couple an electronic device may also require that the user has enabled automated pairing between the device and a network. Automated pairing between an electronic device and a network may use an electronic information exchange paradigm, such as Bluetooth®, or a wireless local area network protocol, such as Wi-Fi®. Further, a fixed communications network may initiate a pairing process, and detect every electronic device within the network range that is enabled to communicate within the selected communications paradigm (e.g., Bluetooth®, Wi-Fi®) independently of the location of a specific location of the user or the device. Therefore, current pairing techniques may not independently identify the physical location of the user or the device.

In some situations, there may be a need to control an electronic device based on the location of the user or the device. For example, federal laws and regulations restrict the use of an electronic device on an airplane. Therefore, in accordance with such laws, a system or method may be used to control the use of an electronic device on an airplane.

In addition, a person who is driving a vehicle or operating a machine may be impaired by their concurrent use of an electronic device. Therefore, in order to prevent a vehicular accident, a system or method may be used to control an electronic device based on the actual physical location of either the person or the device.

Various systems and methods that estimate, or determine the proximate location of a device are known in the art. For example, GPS and/or cellular network triangulation may indicate that an electronic device is in motion, and cooperatively-loaded application software on the electronic device may control handheld use of the device. However, these systems and methods cannot distinguish whether the electronic device is in the possession of a driver or a passenger. Therefore, a passenger of a vehicle (i.e., someone other than the driver), whose use of an electronic device does not negatively impact the operation of the vehicle, may have to manually bypass a system or method used to control the electronic device.

Further, various systems or methods used to control an electronic device may not distinguish between different modes of transportation. For example, while it may be desired to control the use of an electronic device by a driver of a vehicle, the same electronic device may not need to be controlled for use on public transportation (e.g., train, bus, taxi, etc.).

In an alternative system, a wireless transmitter for a fixed communications network, such as a vehicle communication bus in a vehicle communications network, may transmit a signal to an electronic device that includes information relating to a condition of a network. In the case of a vehicle, the information in a signal may include whether the vehicle is in motion or in gear. Cooperatively loaded application software on an electronic device may detect the signal from the fixed communications network. Depending on the information included in the signal, the application software may control various features of the electronic device. For example, cooperatively loaded application software on the electronic device may use information from a signal to limit the handheld use of the device, or to provide cellular notification to back-end services (e.g., speed alerts).

A system or method for automated network pairing using electric field coupling may require an electronic device to include hardware that can receive or transmit a signal to the fixed communications network. A system or method for automated network pairing using electric field coupling may also require software to interface with the fixed communications network or detect a signal transmitted by the fixed communications network. Such an electronic device that is in proximity to detect a signal transmitted by the network may be controlled by the cooperatively installed software on the device.

Prior disclosures are already in the art and are based on using electromagnetic fields for occupancy (in seats) or hand detection (in steering wheels), where the use of sufficiently low frequencies of an AC field in these sensors can couple the field to the surrounding space. Qualities and characteristics of the transmission medium within the surrounding space determine the signal strength of transmitted data signals and opportunities for subsequent use of this data in other applications.

For example, the complex impedance of an occupant in a vehicle is favorable to electromagnetic field coupling in free-space, leading to electromagnetic coupling through the human body medium (e.g. establishing a Body Area Network or "BAN"). Through modulation of the electromagnetic field being transmitted through the Body Area Network, information can be coded and sent and/or received through the human body medium by coupling of at least the electric field (as opposed to the corresponding magnetic field) to the electrode.

For example, an electric field sensor (i.e., an "e-field sensor") with an electrode or transceiver positioned in a vehicle seat, transmitting a low frequency signal (such as but not limited to a frequency less than about 31 Mhz), may emit a coded AC signal in proximity to a human occupant sitting in the seat. This electrode will induce a corresponding electromagnetic field that tracks the coded signal. The induced electromagnetic field can be detected/decoded by a second electrode (or, similarly, a second transceiver), when the second electrode is in proximity to and/or touching the occupant and when the second electrode is connected to an appropriate electromagnetic field detector/decoder to extract the coded information. This concept has been designated broadly in the art as a Personal Seat Communications (PSC™), particularly for installations in which the electromagnetic signal is received at an electrode as part of a human-machine interface (HMI), such as a vehicle component that is configured to be touched by the seat occupant. In certain previously published embodiments, the amplitude changes in the electromagnetic field due to an occupant are used to detect the occupancy state, and if the seat is occupied by a human, the coupled signal can be modulated to transfer information through the Body Area Network. Several possible applications have been proposed for such a system, for example, to 1) control the state of HMI content in the vehicle based on driver or passenger touch and the vehicle control state; 2) control the state of a cellular device in the vehicle, based on driver or passenger touch and the vehicle control state; 3) enable/disable access to a wireless network in a vehicle based on the occupancy state of a seat or region inside the vehicle, and the state of a cellular device held by the occupant (e.g. a "secure connection handover"). A wide set of potential related use cases has been disclosed based on the above three concepts.

Figure 1:
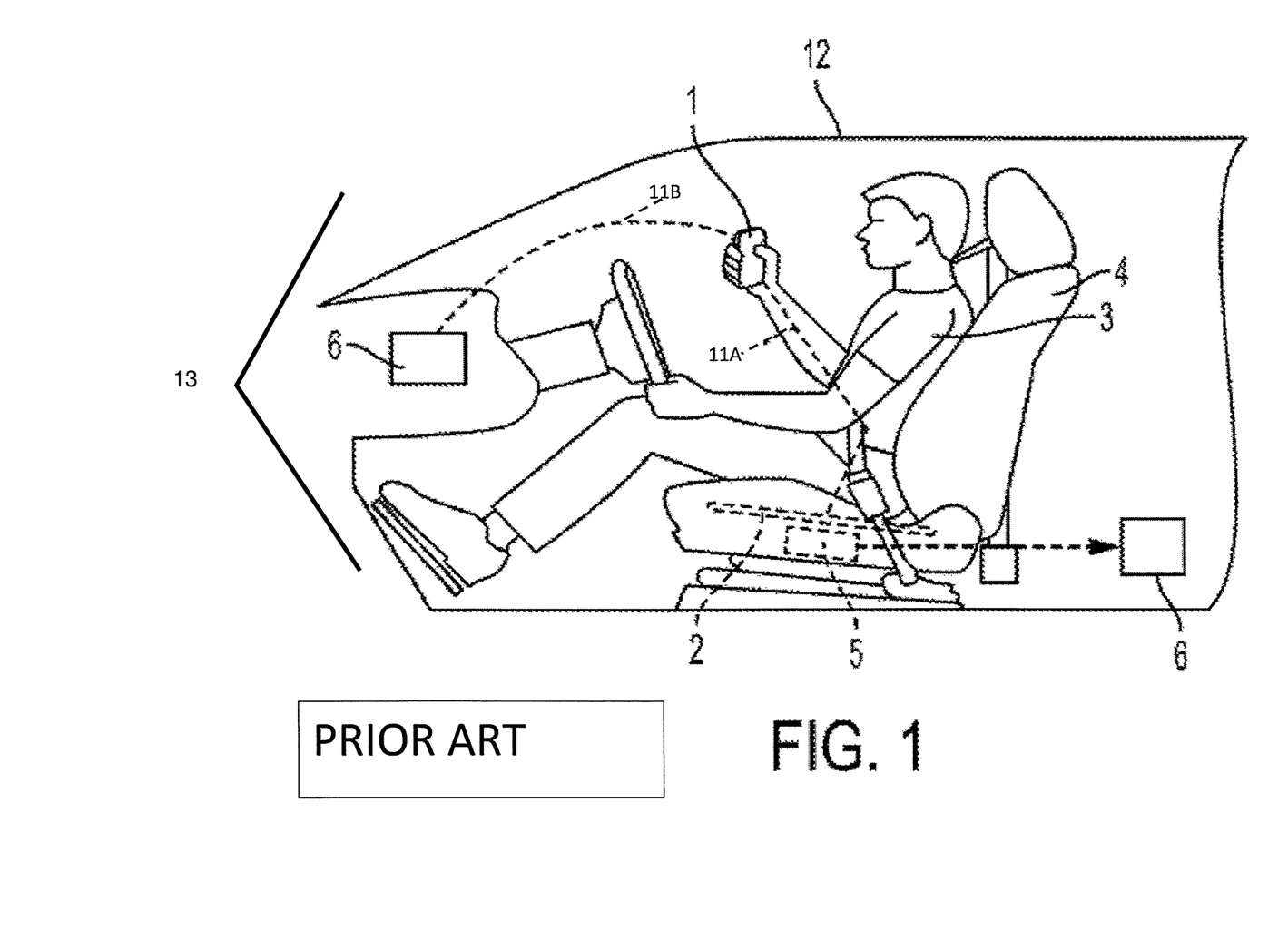
FIG. 1 shows a PRIOR ART schematic view of a personal communications device in use within a vehicle equipped with an occupancy sensor electrode in communication with a vehicle's main communication system.

Prior art as shown in FIG. 1 illustrates the above described embodiments and shows an electric field coupling network 11A, 11B that may be used to electronically couple or pair a fixed communications network, such as a vehicle communications bus 6, with an electronic device 1. A driver 3 of a vehicle 12 may be seated on a vehicle seat 4, and an electronic device 1 may be coupled to the driver (e.g., an electronic device 1 may be held in the hand of the driver 3, in a pocket of the driver's clothes, or in any other location that is sufficiently proximate to the driver to couple an electromagnetic field between the driver and the electronic device). A system 13 used to electronically couple an electronic device to a network, via electromagnetic coupling in a personal seat communications (PSC™) system, may include a capacitive sensor pad 2 provided in a vehicle seat 4 within a vehicle 12. While the sensor pad 2 may be provided in a driver's seat 4 of a vehicle, this disclosure is not intended to limit the possible locations in which a sensor pad may be located. Therefore, according to alternative embodiments of this disclosure, a sensor pad could be located anywhere in a vehicle interior (i.e. in a driver or passenger seat (i.e., any front seat or rear seat), the vehicle floor, an arm rest, the steering wheel, a cup holder, or in a vehicle ceiling or part thereof).

Prior to the disclosure set described and claimed herein, there has been no hardware or software enabled method to implement Personal Seat Communications (PSC™) functions by communicating directly from a transmitting electrode directly to cellular phones. In fact, earlier efforts have omitted the possibility of such direct communication. In one prior attempt, an external antenna was installed in a vehicle along with an electromagnetic signal detector and decoder assembly. The antenna received and configured electromagnetic data, received from a transmitting assembly, as a data stream for subsequent transmission via a USB connection from the decoder assembly to the phone.

Providing a more direct connection between the PSC™ and a user's electronic device is desirable to eliminate the necessity of the above described antenna, detector, decoder, and USB connection. In certain non-limiting embodiments, this disclosure relies in part upon near field communications (NFC) to establish the electromagnetic field data coupling for communicating the requisite information from one vehicle system to another. NFC chipsets have been widely developed and deployed in cellular phones as discussed in numerous references over the years. They have evolved over many years and are used ubiquitously with NFC protocol supporting components in numerous environments. More recently, in a power context, NFC chipsets have been developed which facilitate the necessary communication to establish inductive wireless charging. In these charging embodiments, NFC is used as the initiation protocol to establish a handshake between the charging station and a suitable cellular phone (or similar electronic device) and to initiate a battery charging procedure. Similarly, a charging station uses an inductive coil with NFC protocol to "detect" a presence of a phone, to determine a suitable position/orientation of the phone, and while conditions are valid, uses the NFC electrode to charge the phone inductively. NFC chipsets and NFC protocol currently use several operational modes and amplitude modulation encoding schemes depending on the operational mode being used.

The above described systems and methods for pairing and controlling a personal communications device within a certain area, such as a vehicle cabin, require that the personal communications device first pairs with a fixed communication system installed in the vehicle (e.g., Wi-Fi®, Bluetooth®, or the like). A need continues to exist in the art of personal communications from within a vehicle interior for apparatuses, systems, and methods that accommodate control for personal communications devices independently of fixed communications networks within the vehicle.

A need further exists in the art of vehicle operation with use of personal communications devices for apparatuses, methods, and systems that accomplish the following:

(a) Using an existing, well-established protocol and chipset configured for near field communications (NFC) to include completely new functionality to support a ubiquitous solution to driver distraction due to phone usage;

(b) Supporting optimized phone use for a driver during autonomous driving modes, including the potential to use the phone itself as a warning device to prepare for transition to non-automation modes (e.g. transition to driver in manual control);

(c) Including a separate e-field body area network (BAN) communication protocol into an existing electromagnetic field proximity protocol (such as but not limited to NFC) in a single chipset in which the new e-field protocol can use an existing, validated protocol/security hardware/software stack;

(d) Including occupancy sensors with existing NFC functions and a shared electrode to support inductive charging in vehicle seats when they are empty of occupants, wherein the electrode can also be used as a heater element in a heater as sensor embodiment (HAS), an NFC inductive communication antenna, and an inductive charging electrode.

BRIEF SUMMARY OF THE INVENTION

A system for controlling a personal communication device 100 in a vehicle 120 includes a first near field communication circuit 300 positioned within a vehicle seat 40, 640, 740, 840, the first near field communication circuit comprising a sensing electrode 310A, 310B, 625A, 625B, 725A, 725B, 825A, 825B in data communication with a first inductive coil 325, serving as an antenna, and a first transceiver circuit 379. A second near field communication circuit 375 is positioned within a personal communications device 100, the second near field communication circuit 375 includes an inductive transceiver 377 establishing a second data communication with a second inductive coil 380. The first near field communication circuit 300 and the second near field communication circuit 375 are configured for communicating via inductive coupling 390, and the first near field communication circuit transmits control data from the vehicle seat to the second near field communication circuit in the personal communications device.

In one embodiment, a system for controlling a personal communication device in a vehicle includes a first near field communication circuit positioned on a component inside the vehicle, the first near field communication circuit comprising an occupancy sensor in data communication with a first inductive coil wherein the component inside the vehicle is configured to establish a body area network with a body in the vehicle; a second near field communication circuit positioned within a personal communications device, the second near field communication circuit comprising an inductive transceiver in data communication with a second inductive coil, wherein the first near field communication circuit and the second near field communication circuit are configured for communicating via inductive coupling across the body area network, and wherein the first near field communication circuit transmits control data from the component inside the vehicle to the second near field communication circuit in the personal communications device.

The control data from the component inside the vehicle is transmitted directly to at least one control circuit in the personal communications device. A system according to this disclosure further includes the control circuit in the personal communications device having at least one of an operating system, a charging circuit, a power circuit, a communications display circuit, and a communications transceiver circuit. The component in the vehicle may be a vehicle seat, and the body in the vehicle may be a human body positioned on the vehicle seat such that the vehicle seat and the human body form a personal seat communications system configured for communicating with the second near field communication circuit in the personal communications device via the body area network. The occupancy sensor is a first electric field sensor and wherein the inductive transceiver in the personal communications device is in data. The inductive coupling between the first and second near field communication circuits is established according to a personal seat communications electric field protocol. The first and second near field communication circuits comprise respective chipsets have at least one of a personal seat communications system detector, an inductive communications data demodulator, and a security and processing protocol stack in communication with respective computerized memory and a respective processor. The inductive coupling between the first and second near field communication circuits is established across an electric field comprising a carrier signal encoded with the control data, wherein an encoded signal is transmitted via the inductive coupling at a transmission frequency less than or equal to 21 MHz. The encoded signal is transmitted via the inductive coupling at a transmission frequency less than or equal to about 1.5 times the frequency of the carrier signal. The carrier frequency may be 13.6 MHz in one non-limiting embodiment.

In another embodiment, a system for controlling a personal communication device in a vehicle includes a first near field communication circuit positioned within a vehicle seat, the first near field communication circuit including an electric field sensor in data communication with a first inductive coil and a first transceiver circuit. A second near field communication circuit is positioned within a personal communications device, the second near field communication circuit comprising an inductive transceiver establishing a second data communication with a second inductive coil. The first near field communication circuit and the second near field communication circuit are configured for communicating via inductive coupling, wherein the first near field communication circuit transmits control data from the vehicle seat to the second near field communication circuit in the personal communications device.

A system may include a vehicle transceiver within a vehicle instrument panel transmitting vehicle operating data to the first transceiver circuit in the vehicle seat and/or to the second transceiver circuit in the personal communications device. The system may include a seat control unit having computerized memory and a computer processor running a communications software stack and a personal device control unit comprising additional computerized memory and a second computer processor running a corresponding communications software stack. The electric field sensor may be an occupant classification sensor transmitting seat occupant data to the seat control unit. The vehicle transceiver transmits vehicle operating data to the seat control unit, and the computer processor in the seat control unit modulates an inductive signal from the first inductive coil with control data derived from the seat occupant data and the vehicle operating data and transmits an encoded inductive signal to the personal device control unit via the inductive coupling.

In a system according to this disclosure, the personal device control unit demodulates the encoded inductive signal and initiates a function from the corresponding communications software stack. The function initiates a power charging protocol via the inductive coupling when the seat occupant data indicates that the vehicle seat is empty. The function initiates a personal communications device operating protocol via the inductive coupling when the seat occupant data indicates that the vehicle seat is occupied. The vehicle seat is the driver's seat in the vehicle. For some embodiments, the vehicle seat is occupied by a human body establishing a body area network comprising the human body, the first near field communications circuit and the second near field communications circuit, and wherein the inductive coupling between the first and second near field communications circuits is established across the body area network. The vehicle operating data may include autonomous driving mode data. The electric field sensor in the vehicle seat is configured for use as at least one of a heater element, an inductive communication antenna in communication with a separate occupant classification sensor in the vehicle seat, and an inductive charging electrode for charging the personal communications device in the vehicle.

In other embodiments, a method of controlling a personal communications device positioned inside of a vehicle includes utilizing a computerized seat control unit to encode an inductive communication with control data; utilizing a computerized personal device control unit to initiate at least one computerized function according to the control data; and communicating the control data in an encoded inductive communication transmitted via inductive coupling between a first near field communication circuit in the vehicle seat and a second near field communication circuit in the personal communications device.

The methods further include deriving vehicle seat occupant data from an occupant classification sensor in the vehicle seat; computing, with the computerized seat control unit, the control data with the vehicle seat occupant data. Other embodiments encompass utilizing an electric field sensor positioned in the vehicle seat to detect either a human body occupying the seat or the personal communications device positioned on the vehicle seat without the human body therein; deriving the control data from a detection signal transmitted from the electric field sensor; upon the control data indicating detection of the personal communications device positioned on the vehicle seat without the human body in the vehicle seat, and utilizing the computerized personal device control unit to initiate a charging function, wherein the charging function enables a power circuit in the personal communications device to receive a power charging communication via the inductive coupling.

At least one embodiment of this disclosure shows a method including utilizing an electric field sensor positioned in the vehicle seat to detect either a human body occupying the seat or the personal communications device positioned on the vehicle seat without the human body therein; receiving, at the computerized seat control unit, a detection signal from the electric field sensor and vehicle operating data transmitted from a vehicle transceiver within the vehicle; deriving the control data from the detection signal transmitted from the electric field sensor indicating that a human body occupies the vehicle seat and the received vehicle operating data; and utilizing the computerized personal device control unit to perform the following computerized steps: (i) confirm inductive communication transmission with first near field communication circuit in the vehicle seat; (ii) identify that the control data has been encoded with a vehicle seat occupied code, an engine operating status code, and a transmission engagement code; and (iii) initiate a pre-programmed function in the personal communications device according to at least one of the codes.

DETAILED DESCRIPTION

Various embodiments of the present disclosure will be described below with reference to the drawings. It is to be understood that both the foregoing general description and the following detailed description are exemplary and explanatory only, and are not restrictive of the disclosure.

According to an exemplary embodiment, a system and method may identify and establish a communication paradigm between a body area network (BAN) 270 and an electronic device 100, also referred to herein as a personal communications device 100, in which the communication medium is established through the human body 30. Electronics installed in the vehicle may be positioned so that the electronics are in sufficient proximity to the human body that the human body may serve to propagate communications signals therethrough and to the electronic device 100.

A system proposed herein may associate the physical presence of an occupant (e.g., vehicle seating location) with a location of the electronic device (e.g. held in a user's hand or pocket). Such a system may allow one-way or two-way communication between the body area network 270, including electronics installed within the vehicle 120, and the personal communications device 100. These communications traverse through an occupant 30, in order to establish control/communication parameters of the personal communications device 100, as well as software application activation, based on a specified position and/or other parameters regarding the vehicle 120, the occupant 30, and the personal communications device 100.

Referring to FIGS. 1-8, and according to various embodiments of this disclosure, a sensing electrode, which may be configured as a sensor pad 20, may be able to detect the presence or occupancy of a person or object that is positioned within a designated location. Further, sensor pad 20 may be configured to detect various characteristics of an object, such as its position on a seat 40. Sensor pad 20 may also be configured to discriminate or categorize the object (e.g., person 30, baby seat, shopping bag, etc.), and to detect other characteristics of the object (e.g., stature, position, weight, loading, etc.). In addition, sensor pad 20 may be provided as a component of another system, such as an occupant detection or classification system.

Figure 2:
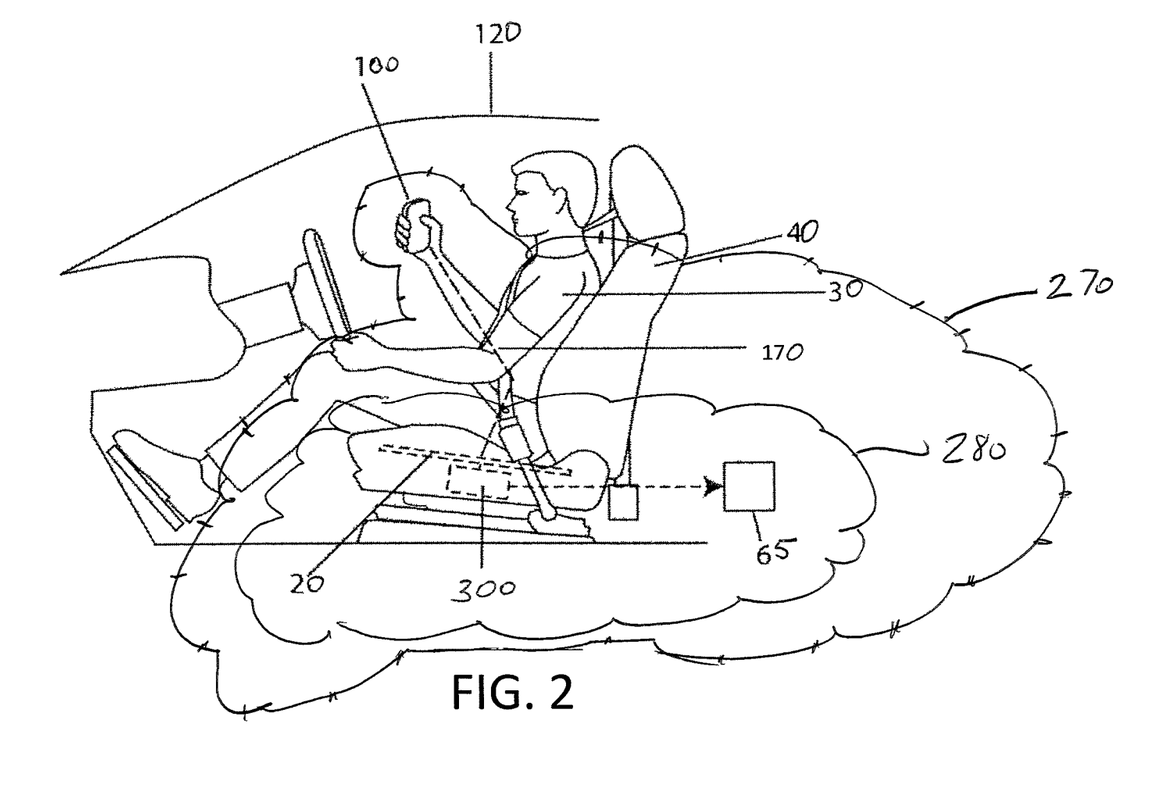
FIG. 2 is a schematic view of a personal communications device in use within a vehicle and controlled by inductive coupling with a person seat communications circuit via body area network inside the vehicle.

Referring to FIGS. 1-8, and according to various embodiments of this disclosure, a system as shown in FIG. 2 may also be configured to transmit a signal 170 to a conductor in the sensor pad 20 and through a person 30 positioned within a designated location. When the system is used for occupant sensing, a sensing circuit may be provided for signal generation. Alternatively, a separate control unit 65 including a signal generator may be provided. The signal generator provides a signal, e.g., a sinusoidal electrical current or voltage signal, to an electrode 20 in the seat, on the floor, on the vehicle ceiling or other location proximate to the person 30 occupying the seat. For instance, the transmitted signal 170 may have a particular frequency and power, and the frequency of the transmitted signal 170 may be configured to allow it to be redistributed through the person 30 via electric field coupling 390 when the person is positioned within a designated location. Such a signal may be configured so that it is not strong enough to be transmitted through the air surrounding a person positioned within a designated location, but the signal is particularly directed to and applied predominantly within the body area network (i.e., more particularly, through the human body of the occupant 30).

According to an exemplary embodiment shown in FIG. 2, sensor pad 20 may transmit a signal 170, which may be configured to be redistributed via electric field coupling through driver 30 that is sitting on seat 40. According to an alternative embodiment, a sensor pad may be disposed within the floor or on the roof or ceiling of a vehicle and be configured to transmit a signal to a person who is positioned over or under a sensor pad 20. The transmitted signal 170 may be configured to be redistributed through person 30 via electric field coupling.

Sensor pad 20 may also be electronically coupled to support electronics which may be configured to measure the amount of electric field coupling between sensor pad 20 and objects proximate the sensor pad. According to an exemplary embodiment shown in FIG. 2, the support electronics may be, in turn, electronically coupled to a vehicle communication bus 65. The support electronics may include at least one integrated circuit, discrete electronic components, printed circuit board, or microprocessor, for example. The sensor pad 20 may be a part of a capacitive sensing subsystem employed with the system may be similar to the systems disclosed in U.S. Pat. No. 6,392,542 and U.S. Published Patent Application No. 2007/0200721 (both incorporated by reference herein).

As shown in FIG. 2, and according to various exemplary embodiments of this disclosure, an electronic device 100 may be configured to detect the transmitted signal 170 when the signal 170 is transmitted through a person, and the electronic device 100 is coupled to the person. According to the embodiment shown in FIG. 2, an electronic device 100 may be configured to detect the transmitted signal 170 when electronic device 100 is positioned within a designated location, such as the driver's seat of a vehicle. The detection of the signal may be conducted utilizing a tuning circuit located in the electronic device. Exemplary tuning circuits are disclosed, for example, in U.S. Published Patent Application No. 2011/0117863. The foregoing published patent application is incorporated by reference herein. An electronic device 100 may also include hardware and/or software to facilitate or control the coupling of the electronic device to a fixed communications network.

According to an exemplary embodiment, the transmitted signal 170 may be configured to carry particular information used to distinguish it from other signals, such as digital or analog information. Further, the power of the transmitted signal 170 may be configured to be sufficiently strong to be transmitted through a person 30 who is coupled to an electric field and/or a magnetic field generated around the signal electrode 20, but not sufficient to be transmitted outside of the person's body. Therefore, in one embodiment, an electronic device 100 may be configured to detect the signal 170 only when the person is concurrently coupled to the electronic device 100 and the electric field 390. When the electronic device detects the signal 170, it may distinguish the signal based on the information contained in the signal.

According to an exemplary embodiment, a fixed communication network 6 in a vehicle 120, in communication with a wireless communications system (such as, but not limited to, Wi-Fi® or Bluetooth®) may initiate a pairing process in order to connect to the personal seat communications (PSC™) circuitry 280. For example, a vehicle communications network that incorporates fixed transmission infrastructure, such as a main vehicle data bus, may continuously transmit a wireless signal to a surrounding area to be connected in a wireless protocol to a wireless transceiver connected to the control circuitry 300 of the personal seat communications system 280. Alternatively, the vehicle wireless network may transmit a wireless signal to a surrounding area when a person is detected within a designated location (e.g., a designated location may be proximate a sensing electrode 20 that transmits an inductive electromagnetic signal). The wireless signal transmitted from the vehicle wireless network may use an authorization or identification process to establish a secure connection with an electronic device. While some examples have been described in which a network may automatically connect with the electronic device 100, it should be understood that the network and the electronic device 100 disclosed herein may perform a variety of methods in order to automatically or manually establish a data connection, according to other exemplary embodiments.

Figure 3:
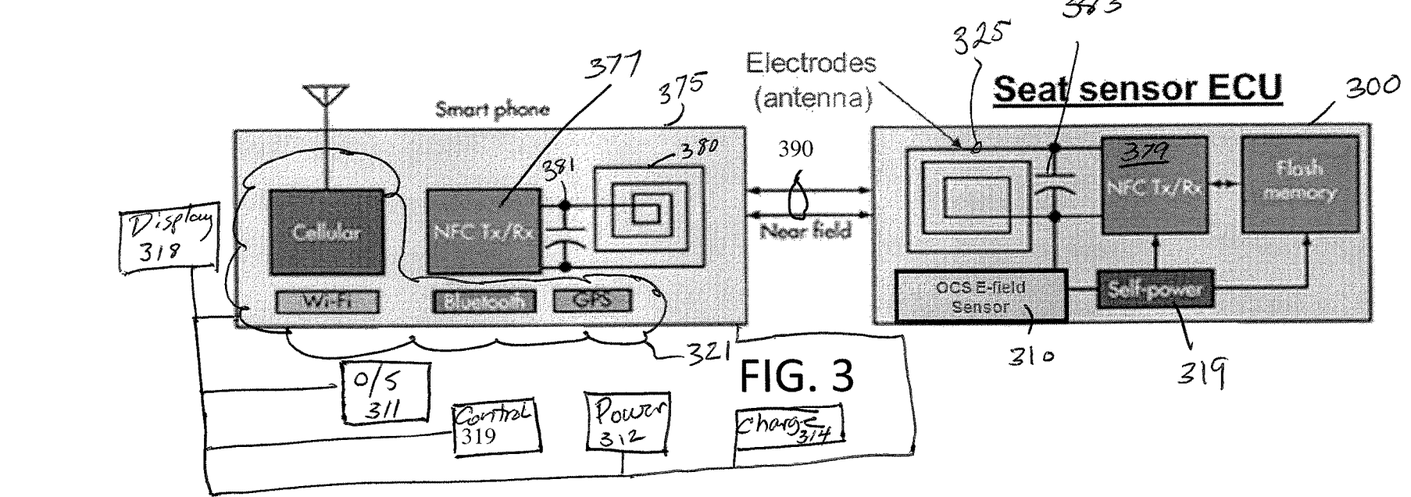
FIG. 3 is a schematic view of respective inductively coupled transceiver circuits in each of a personal communications device and a personal seat communications circuit.

Referring now to FIG. 3, an alternative exemplary embodiment is shown for a system that may use electric field coupling to automatically connect the personal seat communications (PSC™) circuitry 280 to a personal communications device 100 having transceiver circuitry 377.

Figure 4:
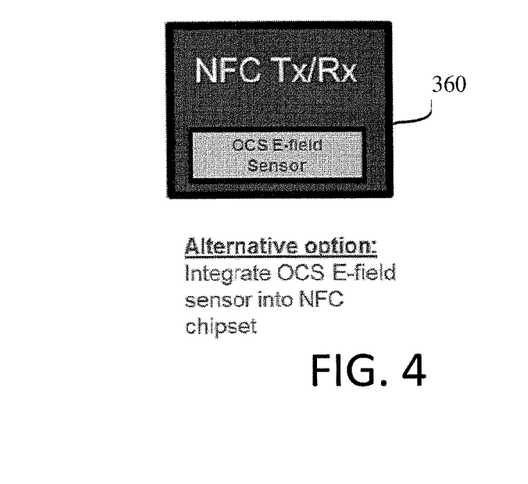
FIG. 4 is a schematic view of an example transceiver integrated circuit chip device according to one embodiment of this disclosure.

According to an exemplary embodiment shown in FIGS. 3-4, an electronic device 100 may include a communications module 321 and a tuned circuit 380, 381 connected to transceiver circuitry 377. The communications module 321 of the electronic device 100 may include several sub-modules configured to detect, filter, modulate, or demodulate signals, including wireless digital or analog signals. The communications module may also include a digital signal processor, among other components. A tuned circuit having an electromagnetic antenna 380, in the form of an inductor or coil, and capacitor 381 may be coupled to a component of an electronic device 100, such as a circuit board, a substrate, or even an outer casing, as part of a second near field communication circuit 375. The tuned circuit may be configured to detect a signal 170 having an inductive coupling frequency when the device is in contact with or proximate to a person's body (e.g., finger, hand, skin, or in proximity to a pocket, waist belt, etc.). Upon receiving the signal 170, the second near field communications circuit 375 may be in data communication with main control circuit hardware 319 and an associated operating system 311 of the electronic device. The processing capabilities of the electronic device, therefore, are in sufficient data communication with the signal 170 to use data from the sensing electrode 20 to control peripheral systems in the electronic device, such as a display 318 or a power circuit 312 that optionally engages a charging protocol via associated software 314.

According to yet another embodiment of this disclosure, a method to electronically couple an electronic device to a personal seat communication (PSC) network 280 may transmit a coded inductive signal from a sensing electrode 20 to a person 30 occupying a certain location and coupled to (or at least proximate to) the electronic device 100. Based upon detection of the electromagnetic signal 170 (i.e., the e-field transmitted by the electrode 20) at the electronic device 100, the electronic device 100 may become electronically coupled to the sensing electrode 20 and/or an inductive transceiver 379 of a first near field communications circuit 300. In such a method, the signal may be configured to be redistributed through a person 30 via electric field coupling 390. Further, in some embodiments, the electronic device 100 may have to be in direct contact with the person 30 serving as a human transmission medium in order to detect the signal.

A sensor pad 20 and supporting electronics may cooperate with hardware and software added to an electronic device 100 to detect the location and possession of the device. According to an exemplary embodiment, when an electronic device 1000 is detected in a particular location, this information may be used, for example, to disable the use of an electronic device in possession of the driver while the vehicle is operational. In a similar fashion, a system may be configured to detect and control an electronic device 100 that is placed on an unoccupied seat (e.g., when a driver places a cell phone on an empty passenger seat, an inductive charging operation controlled by associated software 314 may commence).

According to alternative embodiments of this disclosure, a sensor pad or sensing electrode 20 may be incorporated into various other vehicle compartments. For example, a sensing electrode may be embedded in a cup-holder, a phone receptacle, a vehicle roof or ceiling, or another location at which an electronic device may be placed proximately thereto. According to an alternative embodiment, a sensing electrode may be located in a passenger seat and configured to generate not only a signal having a capacitively coupled frequency for a first system (e.g., an occupant classification system) but also an inductive signal within the electromagnetic spectrum. For inductive signal coupling, an electronic device 100 may detect the transmitted signal via e-field coupling when the electronic device 100 is placed on the seat, or when the electronic device 100 is otherwise within sufficient proximity of the transmitted signal 170. When electronic device 100 detects the transmitted signal 170, various hardware or software of the electronic device 100 may automatically control its use while the vehicle is in motion. Also, hardware or software of electronic device 100 may electronically couple or "pair" the device with a fixed communications network, such as a main vehicle communications bus 6, and enable use of hands-free technology in operating the vehicle and vehicle accessories.

According to alternative embodiments of this disclosure, a system to electronically couple an electronic device and a fixed communications network via a PSC™ may be utilized in a wide variety of locations, including personal and public transportation vehicles, homes, schools, business locations, and other venues. Advantageously, several personalized and selectable communications modes, which are based on the physical location of an electronic device 100, may exist for the particular personal seat communications (PSC™) systems used to electronically couple an electronic device 100 and a fixed communications network. The electronic device 100 may be configured to operate within the PSC™ system and may include personalized, selectable communication modes based on physical locations of the electronic device 100 and the human body medium 30 (e.g., a car driver mode, a car passenger mode, a bus mode, a plane mode, a train mode, a theater mode, etc.) where the characteristics of the automated network would be set based on mode (e.g., cell phone ringer disabled in movie theater; hands-free enabled in car driver seat; music/video playback enabled in bus, infotainment system enabled in a plane seat back, etc.).

Advantageously, according to various embodiments of this disclosure, a system according to this disclosure may allow a single fixed communications network, such as a human machine interface (HMI), to be customizable by a specific human touch by allowing a user interface to function differently for multiple proximal occupants. In other words, an HMI may distinguish between a person who is positioned within a particular location, and a person positioned in an alternative location. For example, an HMI in the form of a dash-mounted touch screen in a vehicle may be configured to function in a first manner with respect to a driver of the vehicle, and in a second manner for a passenger of the vehicle.

This disclosure is based in part on implementation of an electric field personal seat communication (PSC) protocol within an inductively charged region. Embodiments described herein support a near field communication (NFC) chipset in respective portions of a vehicle 120 and within a personal communications device 100. Such a chipset can then be utilized to support safety and security applications including the reduction of driver distraction due to cellular phone use at inappropriate times, improved security of vehicle based wireless network communications based on occupancy detection sensing electrode 20, and secondary body area network (BAN) communications between the seat sensor and NFC enabled devices held/possessed by the occupant. Alternatively, as shown in FIG. 4, the E-field sensor function could be integrated directly into an NFC chipset that supports the PSC E-field communication protocol.

This disclosure includes, within one non-limiting embodiment, implementation of a personal communications device (i.e., electronic device 100), such as a cellular phone, in communication with a source of inductively charged and modulated data signals (i.e., sensing electrode 20). The communications between these components may be included as a portion of another vehicle control operations such that components in the vehicle serve dual purposes with e-field functionality. In a phone, or other personal communications device 100, this disclosure embodies the use of existing equipment likely to be present in a personal communications device, such as NFC transceivers 377, a tuned circuit for two way e-field communications (i.e., an antenna 380 and a capacitor 381) and other components allowing an electronic device 100 to operate with resonance detection of a near field communication carrier 510 as part of a standard a "listener/polling" process.

For a first near field communications circuit 300 positioned within a vehicle 120 for inductive e-field communications with a second near field communications circuit 375, the system incorporates NFC chipsets that include respective e-field transceivers 377, 379 in both circuits. A communications system, that enables data transmission between the respective near field communications circuits 300, 375, can then use an occupancy sensor already placed in the vehicle as an inductively sensing electrode 20. Peripheral circuitry about the sensing electrode 20 may impart NFC functionality to the sensing electrode 20 and take advantage of a human body as a transmission medium for data communication between a personal seat communications (PSC™) network and an electronic device 100 connected to the second near field communications circuit 375. The same equipment may also be used to impart inductive charging functionality to the electronic device 100 if the electronic device (e.g., any NFC enabled electronic device or personal communications device like a laptop) is within range of the inductive signal emanating from the sensing electrode 20.

An electronic device 100 as set forth in this disclosure typically includes inductive charging equipment within its power circuit and meets established NFC proximity/antenna position requirements for "safe" charging. Along these lines, for example, a first near field communications circuit 300 may be incorporated into the vehicle 120 in a multitude of possible positions and can discriminate a human 30 from a personal communications device 100 and distinguish when either or both are in the path of an inductive signal emanating from the first near field communications circuit 300. In the example of FIG. 3, the first near field communications circuit 300 includes a respectively tuned circuit to transmit an inductive signal from an antenna 325 in the form of a coil or inductor connected to a capacitor 383. A tuned circuit in the first near field communications circuit 300 may receive coded information from a sensing electrode 20 and provide an induced signal from the antenna/coil 325 that is modulated by an output from the sensing electrode 20. For example, when the electronic device 100 is positioned within a vehicle seat 40 in the absence of a human occupant 30, the first near field communications circuit 300 emits an inductive signal from a sensing electrode 20 sufficient for battery charging only if no human is in the seat (e.g. the NFC circuit in the seat sensor detects a presence of a phone, determines that the phone exhibits valid placement for charging and that inductive charging is feasible for the phone in the current position). These embodiments charge the phone while conditions are valid (e.g. phone is not picked up/moved). In this embodiment, the first near field communications circuit 300 utilizes the e-field sensor 310 to transmit an inductive charging signal at a frequency and amplitude sufficient to charge a battery within the electronic device 100. As illustrated in FIG. 4, the e-field sensor 310 transmitting the charging signal may be the above described sensing electrode 20 that is part of another vehicle control system (e.g., one of the sensors serving dual purposes in an occupant classification system) or the e-field sensor may be a component 360 on an overall near field communications transceiver chip.

Figure 5:
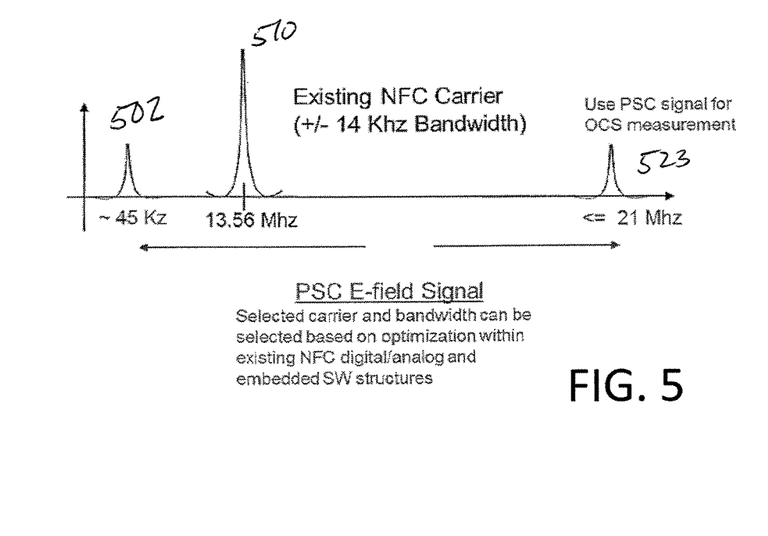
FIG. 5 is a frequency versus magnitude plot of carrier frequencies used in accordance with this disclosure.

This disclosure describes implementations of near field communications systems implemented with coded inductive signals that impart new functionality to both a vehicle 120 and electronic devices 100 positioned or used within the vehicle. FIG. 5 shows how the inductive signal used in either a power charging or a data communications context may be tailored to resonant carrier frequencies 502, 510, 523 and corresponding bandwidths for numerous applications. In the context of communicating with an electronic device 100 positioned within a vehicle 120, the embodiments described herein may use existing NFC chip and antenna configurations. In one non-limiting embodiment, the systems described herein accommodate resonance detection of the e-field carrier and "listener/polling" processes to ensure proper transmission, which can be uni-directional or bi-directional communication. For embodiments that incorporate the concept of utilizing existing electrodes and sensors to transmit an inductive signal through the vehicle and/or through a human body medium, the embodiments of this disclosure are configurable to be used with existing NFC chipsets and occupancy sensors already positioned in vehicles.

Figure 6A:
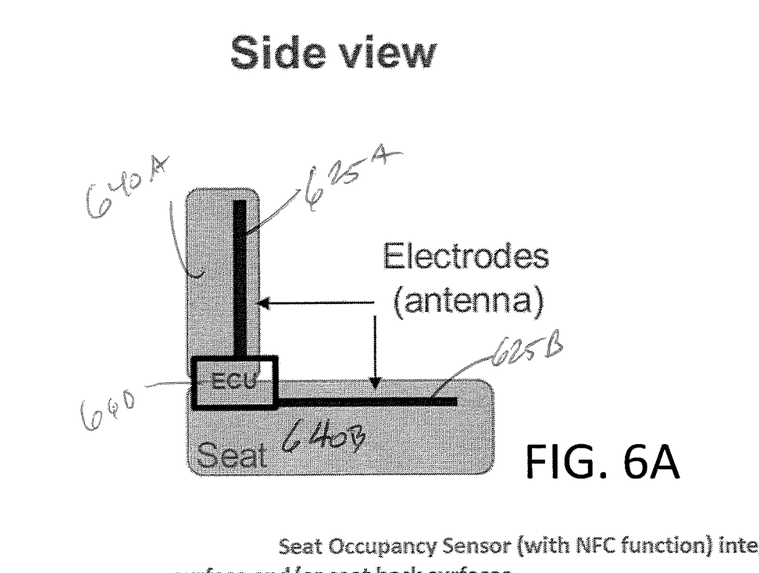
FIG. 6A is a side view schematic of a vehicle seat incorporating an inductive transceiver circuit and associated sensors as described herein.
Figure 6B:
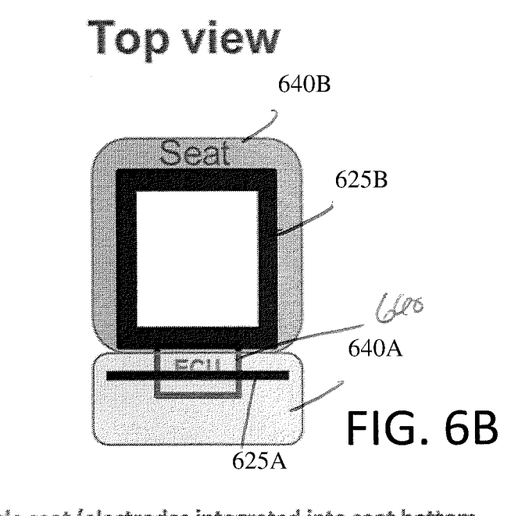
FIG. 6B is a top view schematic of a vehicle seat incorporating an inductive transceiver circuit and associated sensors as described herein.
Figure 7A:
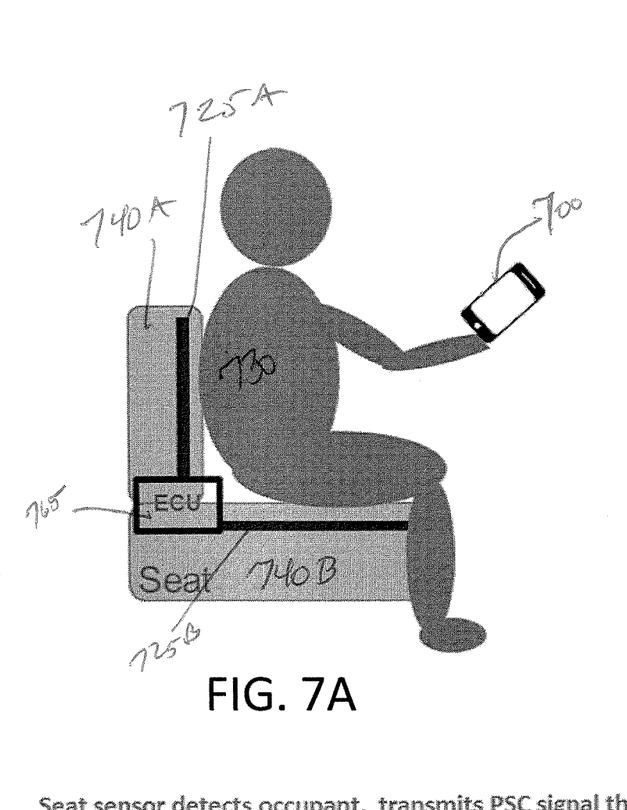
FIG. 7A is a side view schematic of a vehicle seat incorporating an inductive transceiver circuit and associated sensors with a human body in contact with a personal communications device as described herein.
Figure 7B:
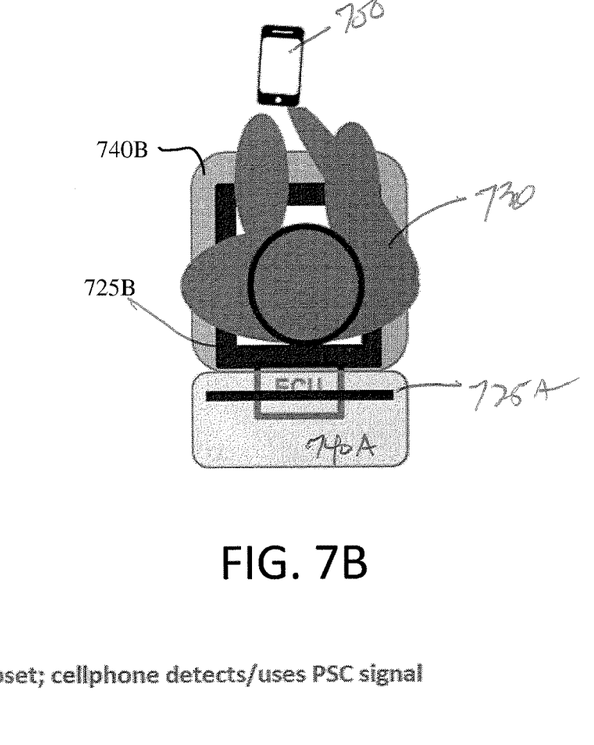
FIG. 7B is a top view schematic of a vehicle seat incorporating an inductive transceiver circuit and associated sensors with a human body in contact with a personal communications device as described herein.
Figure 8A:
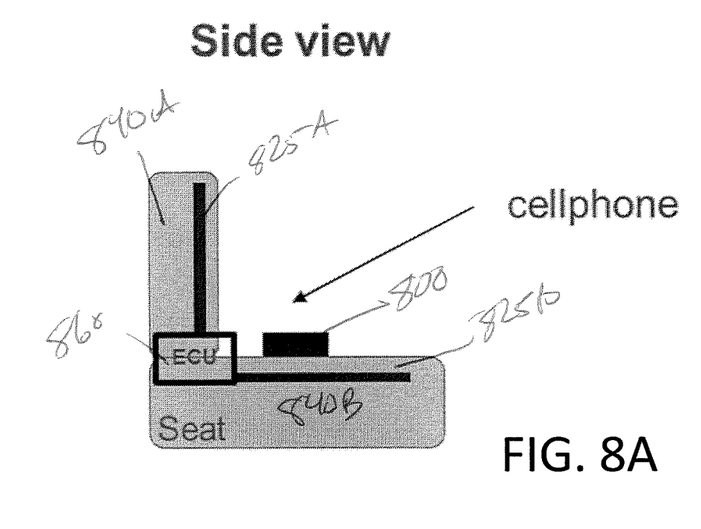
FIG. 8A is a side view schematic of a vehicle seat incorporating an inductive transceiver circuit and associated sensors with a personal communications device in the vehicle seat as described herein.
Figure 8B:
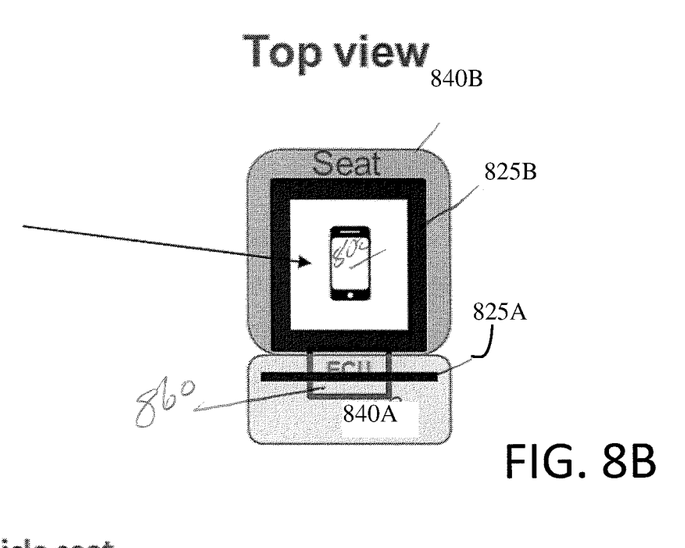
FIG. 8B is a top view schematic of a vehicle seat incorporating an inductive transceiver circuit and associated sensors with a personal communications device in the vehicle seat as described herein.

Example applications that would be enabled the concepts described herein are based on a single driver in the vehicle. The driver enters the vehicle and positions his or her body between a seat back 640A, 740A and a vehicle seat 640B, 740B. The method described and claimed herein proceeds as follows:

a. A driver, e.g., a human occupant 30, enters through a vehicle door and positions his or her body between a vehicle seat back 640A, 740A and a vehicle seat bottom 640B, 740B such that an e-field sensor 625A, 625B, 725A, 725B detects and classifies a human occupant 30. More than one e-field sensor may be present and used in various embodiments of this disclosure.

b. The personal seat communications system PSC™ is configured to transmit an inductive signal, coded with a "driver in seat, engine off code," and sends the inductive signal 170 through the driver and through a body area network (BAN) as described above. The driver, or human occupant 30, may be either directly touching and/or holding an electronic device 100, such as but not limited to, a cellular phone. The code includes a "vehicle/seat specific token" to allow the electronic device 100 to "pair" Bluetooth® and/or Wi-Fi® within the vehicle and identify the user, or human occupant 30, as the "Driver".

c. In this continued example that does not limit this disclosure, the electronic device 100 incorporates near field communication (NFC) hardware and software that is PSC™ enabled to detect and decode the "driver in seat, engine off code" including the "pairing code." The electronic device 100 then initiates respective "auto pairing" processes directly with both the PSC™ through a body area network (BAN) and separately with a fixed communication network, such as a vehicle wireless network, using at least one "pairing code" which could be cybersecure and time limited to minimize hacking/spoofing from non-driver devices.

d. In the context of the fixed communications system, the vehicle Wi-Fi® receives the pairing request and sends a confirmation receipt via the wireless network to the electronic device 100. Optionally, the electronic device 100, 700 displays the pairing confirmation request to the driver, and the driver accepts or denies the pairing.

e. A similar pairing allows for bi-directional communication between the electronic device 100, 700 and a first near field communications circuit 300 in the vehicle, such as the sensing electrode 20 that is part of an occupant classification system in a vehicle seat back 640A, 740A, a vehicle seat bottom 640B, 740B or in any of the other locations noted above for the sensing electrodes. As shown in FIGS. 6 and 7, the sensing electrode may be comprised of more than one sensing electrode 625A, 625B, 725A, 725B positioned in the vehicle. Outputs from these electrodes may be collected and processed in serial or parallel circuit configurations to confirm not only a presence of a vehicle occupant but also other positional information regarding the human body in the vehicle.

e. Driver places vehicle in "Drive." PSC™ sends "driver in seat, engine on, vehicle in drive" code to either or both of the electronic device 100 and/or a fixed communications network in the vehicle.

f. If the driver touches electronic device, the device NFC circuit (i.e., the second near field communications circuit 375), which is PSC™ enabled, receives and decodes the PSC™ inductive signal 170 from the sensing electrode 20, 625A, 625B, 725A, 725B and may place the electronic device 100 into "Do not distract driver" mode while driving. The vehicle wireless network can also send a "Do not distract driver" code to other vehicle components, while driver is in the seat, to provide redundancy. The electronic device 100 and a vehicle "infotainment" system are configured for optimal human machine interfaces (HMI) while the vehicle is in "Driver" mode, so long as the driver remains in the seat and subject to the e-field sensor detecting the driver therein. In some non-limiting embodiments, when a human occupant touches the electronic device 100 while the codes indicate that the vehicle is in Drive mode, the connection between the electronic device 100 and the vehicle wireless network may allow only "voice activation" of the electronic device 100 through the vehicle infotainment system. The PSC™ codes received at the electronic device through the BAN can still be used as needed to enhance security or send vehicle state information to the electronic device 100.

g. Driver places phone on passenger seat h. The sensing electrode 20 (i.e., the e-field sensor 825B within the seat) detects the electronic device 100, 800 as non-occupant item and the second near field communications circuit 375 (PSC™ enabled) in the electronic device 100, 800 and on the seat bottom 840B, can initiate NFC secure data exchange (13 Mhz channel), redundant PSC data exchange, or charging signal exchange.

i. The electronic device can exchange information with vehicle through NFC via the PSC™ and/or the standard vehicle wireless network. If inductive charging conditions are verified (e.g., no occupant in seat, electronic device 100, 800 is inductive charging enabled, and geometry conditions are met), the electronic device 100, 800 can charge. The electronic device 100 consistently receives a PSC™ signal showing at least one of a passenger in seat code, a vehicle in drive code, and/or a no passenger in seat code. The electronic device software allows the electronic device to remain in "no driver distraction" mode or charging mode as necessary for safe operation.

j. Driver picks up the electronic device from an empty passenger seat bottom 840B, and if conditions for device charging and NFC network are terminated, then the electronic device receives an updated PSC™ code (e.g., driver in seat, vehicle in drive mode) and maintains a "no driver distraction" mode as necessary.

k. Driver puts vehicle in "automated driving mode", when all conditions are valid, and this mode is achieved, the system sends PSC™ code indicating that the driver is in the seat and automated driving is active.

l. Upon receiving other conditions, such as the vehicle being in park mode or automated driving mode, the electronic device 100 receives appropriate PSC™ codes allowing the electronic device to be held in the driver's hand and enables all phone functions by driver. Condition is maintained until transition to manual driving is required.

m. Vehicle automation systems may request the driver to prepare to take control of the vehicle after a period of automated driving. The personal seat communications PSC™ and/or a wireless network code ('ending automation') is received by the electronic device. If the driver is using the electronic device during periods of automated driving, the electronic device display indicates a need to switch back to manual driving. The electronic device and vehicle HMI transition back to "no driver distraction" mode.

n. Vehicle reaches destination and driver (and other possible occupants in the vehicle seating) exits vehicle. E-field sensor no longer detects occupant and terminates wireless network access. Driver and/or passenger(s) unique wireless access token(s) are reset, providing anti-spoofing/hacking security.

o. Phones and/or electric devices remaining on seats can undergo charging based on E-field sensor detection, NFC network conditions, vehicle battery conditions, and duration of those conditions.

Advantageously, one skilled in the art will appreciate that a system may be configured to provide enhanced security when electronically coupling to an electronic device by dependently relying on occupancy or physical possession of a particular device. Further, additional security may be provided, in addition to other limitations, such as requiring a password, an encryption, and other wireless connectivity limitations.

For purposes of this disclosure, the term "coupled" means the joining of two components (electrical, mechanical, or electromagnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the sensing electrode may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagram and flowchart illustration can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagram and flowchart illustration support combinations of means for performing the specified functions, combinations of steps for performing the specified functions and program instruction means for performing the specified functions. It will also be understood that each block of the block diagram and flowchart illustration, and combinations of blocks in the block diagram and flowchart illustration, can be implemented by special purpose hardware-based computer systems that perform the specified functions or steps, or combinations of special purpose hardware and computer instructions.

The figures present an overview of an embodiment of a computer readable medium for use with the methods disclosed herein. Results can be delivered to a gateway (remote computer via the Internet or satellite) for in graphical user interface format. The described system can be used with an algorithm, such as those disclosed herein.

As may be understood from the figures, in this implementation, the computer may include a processing unit that communicates with other elements. Also included in the computer readable medium may be an output device and an input device for receiving and displaying data. This display device/input device may be, for example, a keyboard or pointing device that is used in combination with a monitor. The computer system may further include at least one storage device, such as a hard disk drive, a floppy disk drive, a CD Rom drive, SD disk, optical disk drive, or the like for storing information on various computer-readable media, such as a hard disk, a removable magnetic disk, or a CD-ROM disk. As will be appreciated by one of ordinary skill in the art, each of these storage devices may be connected to the system bus by an appropriate interface. The storage devices and their associated computer-readable media may provide nonvolatile storage. It is important to note that the computer described above could be replaced by any other type of computer in the art. Such media include, for example, magnetic cassettes, flash memory cards and digital video disks.

Further comprising an embodiment of the system can be a network interface controller. One skilled in the art will appreciate that the systems and methods disclosed herein can be implemented via a gateway that comprises a general-purpose computing device in the form of a computing device or computer.

One or more of several possible types of bus structures can be used as well, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems, including the processor, a mass storage device, an operating system, network interface controller, Input/Output Interface, and a display device, can be contained within one or more remote computing devices at physically separate locations, connected through buses of this form, in effect implementing a fully distributed system.

The computer typically comprises a variety of computer readable media. Exemplary readable media can be any available media that is accessible by the computer and comprises, for example and not meant to be limiting, both volatile and non-volatile media, removable and non-removable media. The system memory comprises computer readable media in the form of volatile memory, such as random access memory (RAM), and/or non-volatile memory, such as read only memory (ROM).

In another aspect, the computer can also comprise other removable/non-removable, volatile/non-volatile computer storage media. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device, including by way of example, an operating system and computational software. Each of the operating system and computational software (or some combination thereof) can comprise elements of the programming and the computational software. Data can also be stored on the mass storage device. Data can also be stored in any of one or more databases known in the art. Examples of such databases comprise, DB2™, MICROSOFT™ ACCESS, MICROSOFT™ SQL Server, ORACLE™, mySQL, PostgreSQL, and the like. The databases can be centralized or distributed across multiple systems.

In another aspect, the user can enter commands and information into the computer 102 via an input device. Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit via a human machine interface that is coupled to the network interface controller, but can be connected by other interface and bus structures, such as a parallel port, game port, an IEEE 1394 Port (also known as a Firewire port), a serial port, or a universal serial bus (USB).

In yet another aspect, a display device can also be connected to the system bus via an interface, such as a display adapter. It is contemplated that the computer can have more than one display adapter and the computer can have more than one display device. For example, a display device can be a monitor, an LCD (Liquid Crystal Display), or a projector. In addition to the display device, other output peripheral devices can comprise components such as speakers and a printer which can be connected to the computer via Input/Output Interface. Any step and/or result of the methods can be output in any form to an output device. Such output can be any form of visual representation, including, but not limited to, textual, graphical, animation, audio, tactile, and the like.

The computer can operate in a networked environment. By way of example, a remote computing device can be a personal computer, portable computer, a server, a router, a network computer, a peer device, sensor node, or other common network node, and so on. Logical connections between the computer and a remote computing device can be made via a local area network (LAN), a general wide area network (WAN), or any other form of a network. Such network connections can be through a network adapter. A network adapter can be implemented in both wired and wireless environments. Such networking environments are conventional and commonplace in offices, enterprise-wide computer networks, intranets, and other networks such as the Internet.

Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems described herein can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The embodiments of the method, system and computer program product described herein are further set forth in the claims below.

The invention claimed is:

1. A system for controlling a personal communication device in a vehicle, the system comprising:
a first near field communication circuit positioned on a component inside the vehicle, the first near field communication circuit comprising an occupancy sensing electrode in data communication with a first inductive coil wherein the component inside the vehicle is configured to establish a body area network in the vehicle;
a second near field communication circuit positioned within a personal communications device, the second near field communication circuit comprising an inductive transceiver in data communication with a second inductive coil;
wherein the body area network comprises a human body medium inductively coupling respective electric fields from the first near field communication circuit and the second near field communication circuit;
wherein the first near field communication circuit and the second near field communication circuit are configured for communicating via inductive coupling across the body area network; and
wherein the first near field communication circuit transmits control data from the component inside the vehicle to the second near field communication circuit in the personal communications device.

2. A system according to claim 1, wherein the control data from the component inside the vehicle is transmitted directly to at least one control circuit in the personal communications device.

3. A system according to claim 2, wherein the control circuit in the personal communications device is at least one of an operating system, a charging circuit, a power circuit, a communications display circuit, and a communications transceiver circuit.

4. A system according to claim 1, wherein the component in the vehicle is a vehicle seat, and the body in the vehicle is a human body positioned on the vehicle seat such that the vehicle seat and the human body form a personal seat communications system configured for communicating with the second near field communication circuit in the personal communications device via the body area network.

5. A system according to claim 4, wherein the occupancy sensor is a first electric field sensor and wherein the inductive transceiver in the personal communications device is in data communication with a second electric field sensor positioned within the personal communications device.

6. A system according to claim 1, wherein the inductive coupling between the first and second near field communication circuits is established according to a personal seat communications electric field protocol.

7. A system according to claim 1, wherein the first and second near field communication circuits comprise respective chipsets comprising at least one of a personal seat communications system detector, an inductive communications data demodulator, and a security and processing protocol stack in communication with respective computerized memory and a respective processor.

8. A system according to claim 1, wherein the inductive coupling between the first and second near field communication circuits is established across an electric field comprising a carrier signal encoded with the control data, wherein an encoded signal is transmitted via the inductive coupling at a transmission frequency less than or equal to 21 MHz.

9. A system according to claim 8, wherein the encoded signal is transmitted via the inductive coupling at a transmission frequency less than or equal to about 1.5 times the frequency of the carrier signal.

10. A system according to claim 8, wherein the carrier frequency is 13.6 MHz.

11. A system for controlling a personal communication device in a vehicle, the system comprising:
a first near field communication circuit positioned within a vehicle seat, the first near field communication circuit comprising a sensing electrode in data communication with a first inductive coil and a first transceiver circuit;
a second near field communication circuit positioned within a personal communications device, the second near field communication circuit comprising an inductive transceiver establishing a second data communication with a second inductive coil;
a human body medium inductively coupling respective electric fields from the first near field communication circuit and the second near field communication circuit;
wherein the first near field communication circuit and the second near field communication circuit are configured for communicating via the inductive coupling; and
wherein the first near field communication circuit transmits control data from the vehicle seat to the second near field communication circuit in the personal communications device.

12. A system according to claim 11, further comprising a vehicle transceiver within a vehicle instrument panel transmitting vehicle operating data to the first transceiver circuit in the vehicle seat and/or to the second transceiver circuit in the personal communications device.

13. A system according to claim 12, further comprising:
a seat control unit comprising computerized memory and a computer processor running a communications software stack;
a personal device control unit comprising additional computerized memory and a second computer processor running a corresponding communications software stack;
wherein the sensing electrode is an occupant classification sensor transmitting seat occupant data to the seat control unit;
wherein the vehicle transceiver transmits vehicle operating data to the seat control unit; and
wherein the computer processor in the seat control unit modulates an inductive signal from the first inductive coil with control data derived from the seat occupant data and the vehicle operating data and transmits an encoded inductive signal to the personal device control unit via the inductive coupling.

14. A system according to claim 13, wherein the personal device control unit demodulates the encoded inductive signal and initiates a function from the corresponding communications software stack.

15. A system according to claim 14, wherein the function initiates a personal communications device operating protocol via the inductive coupling when the seat occupant data indicates that the vehicle seat is occupied.

16. A system according to claim 15, wherein the vehicle seat is occupied by a human body establishing a body area network comprising the human body, the first near field communications circuit and the second near field communications circuit, and wherein the inductive coupling between the first and second near field communications circuits is established across the body area network.

17. A system according to claim 15, wherein the vehicle seat is the driver's seat in the vehicle.

18. A method of controlling a personal communications device positioned inside of a vehicle, the method comprising:
utilizing a computerized seat control unit to encode an inductive communication with control data;
utilizing a computerized personal device control unit to initiate at least one computerized function according to the control data;
communicating the control data in an encoded inductive communication transmitted via inductive coupling between a first near field communication circuit in the vehicle seat and a second near field communication circuit in the personal communications device;
initiating a power charging protocol via the inductive coupling when the control data indicates that the vehicle seat is empty.

19. A method according to claim 18, further comprising:
deriving vehicle seat occupant data from an occupant classification sensor in the vehicle seat;
computing, with the computerized seat control unit, the control data with the vehicle seat occupant data.

* * * * *